United States Patent
Thomas, III et al.

(10) Patent No.: US 6,297,924 B1
(45) Date of Patent: Oct. 2, 2001

(54) SYSTEM AND METHOD FOR CARTRIDGE DETECTION AND VERIFICATION USING SIGNAL COMPARISON

(75) Inventors: Fred C. Thomas, III, Ogden; Todd L. Graves, Garland; Todd R. Shelton, Syracuse; Paul Smith, Salt Lake City, all of UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/191,889

(22) Filed: Nov. 13, 1998

(51) Int. Cl.⁷ .................................................. G11B 15/18
(52) U.S. Cl. ................................................. 360/69; 360/60
(58) Field of Search ............................ 360/60, 69, 71, 360/133, 132; 369/54

(56) References Cited

U.S. PATENT DOCUMENTS

| | | | |
|---|---|---|---|
| 3,412,245 | 11/1968 | Halverson | 250/71 |
| 4,047,033 | 9/1977 | Malmberg et al. | 250/341 |
| 4,058,732 | 11/1977 | Wieder | 250/461 B |
| 4,297,584 | 10/1981 | Buchanan et al. | 250/483 |
| 4,442,170 | 4/1984 | Kaule et al. | 428/333 |
| 4,571,085 | 2/1986 | Anderson | 356/445 |
| 4,650,320 | 3/1987 | Chapman et al. | 356/71 |
| 4,678,300 | 7/1987 | Beach | 354/21 |
| 5,029,034 | 7/1991 | Weiley | 360/132 |
| 5,252,836 | 10/1993 | Matthews et al. | 250/571 |
| 5,270,854 | 12/1993 | Lee et al. | 359/359 |
| 5,291,006 | 3/1994 | Nishiguma et al. | 235/454 |
| 5,329,127 | 7/1994 | Becker et al. | 250/459.1 |
| 5,351,268 | 9/1994 | Jensen et al. | 374/131 |
| 5,414,266 | 5/1995 | Sun | 250/459.1 |
| 5,548,106 | 8/1996 | Liang et al. | 235/454 |
| 5,576,110 | 11/1996 | Lin et al. | 428/447 |
| 5,604,006 | 2/1997 | Ponchaud et al. | 428/67 |
| 5,638,228 | 6/1997 | Thomas, III | 360/60 |
| 6,091,563 * | 7/2000 | Thomas, III et al. | 360/69 |
| 6,097,562 * | 8/2000 | Thomas, III | 360/60 |

FOREIGN PATENT DOCUMENTS

| | | |
|---|---|---|
| 0 716 102 A1 | 6/1996 | (EP) . |
| 1 232 570 | 5/1971 | (GB) . |
| WO 97/10307 | 3/1997 | (WO) . |
| WO 98/44504 | 10/1998 | (WO) . |

* cited by examiner

*Primary Examiner*—Andrew L. Sniezek
(74) *Attorney, Agent, or Firm*—Woodcock Washburn Kurtz Mackiewicz & Norris LLP

(57) ABSTRACT

A system and method which is used to identify and discriminate the type of data storage cartridge that has been inserted into a disk drive. A system for identifying a type of data storage cartridge having a marker comprises a light source for emitting light to illuminate the marker, a first photodetector for measuring a first intensity of light received from the marker, a second photodetector for measuring a second intensity of light received from the marker; and a microprocessor for determining the type of data storage cartridge responsive to said first intensity and said second intensity. The determination is made responsive to a comparison of the first and second intensities. An optical detection mechanism is provided so that it can be ascertained with near certainty that an inserted object is an appropriate disk cartridge of a certain type or generation. Sensor comparison (e.g., subtraction or division) is used to distinguish between objects that return light directionally to its source and objects that return light diffusely.

17 Claims, 4 Drawing Sheets

SYSTEM AND METHOD FOR CARTRIDGE DETECTION AND VERIFICATION USING SIGNAL COMPARISON

FIELD OF THE INVENTION

The present invention relates in general to a system for identifying an object using a source of irradiance and at least two detectors of light. More particularly, the present invention relates to a data storage drive for receiving a removable data storage cartridge. Even more particularly, the present invention relates to detecting the presence of, and/or identifying the type of, a disk cartridge that has been inserted in the drive using signal comparison of the light transmitted or reflected from the disk cartridge.

BACKGROUND OF THE INVENTION

Disk drives for receiving removable disk cartridges, including conventional 3.5 inch floppy disk drives, must have some mechanism for detecting the insertion or presence of a disk cartridge in the drive. The actuator that carries the recording heads of the disk drive across the recording surfaces of the disk should not be allowed to move unless the presence of an appropriate disk cartridge which is non-drive damaging is detected. The removability feature requires that the disk drive have a cartridge insertion opening into which foreign objects can be inserted. If these objects physically engage the drive as a legitimate cartridge would, then the heads could be loaded onto or into the foreign object, thereby destroying the drive. Also, the spindle motor of the disk drive will be activated by a falsely detected foreign object, thereby generating particle debris. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

"RETROREFLECTIVE MARKER FOR DATA STORAGE CARTRIDGE", U.S. Pat. No. 5,638,228, to Thomas, III, describes a retroreflective marker in which the reflection of a highly concentrated quasi circular lobe of light is captured by the aperture of a phototransistor in close proximity to a light emitting diode (LED). This emitter/detector pair is in the drive and the retroreflective marker is on the cartridge. The desired light lobe size is provided by the geometric size of the retroreflective elements within the retroreflective marker relative to the spacing of the emitter and the detector in the drive. The retroreflective marker reflects light in a retroreflective manner. The detector in the drive receives the light reflected from the marker, and the drive detects the presence of the cartridge responsive to the received light. This patent is incorporated herein by reference.

"LATENT ILLUMINANCE DISCRIMINATION MARKER SYSTEM FOR DATA STORAGE CARTRIDGES", Ser. No. 08/936,970, filed Sep. 26, 1997, to Thomas, III, et al., now U.S, Pat. No. 6,091,563 describes a latent illuminance marker, such as a phosphor tag, that is attached to a data storage cartridge. After being illuminated, the marker emits latent illuminance that is detected by a photodetector. The decay time or spectral characteristic of the emitted illuminance is measured and is used to identify the data storage cartridge. The latent illuminance marker emits and reflects light in a nondirectional or spherical manner. This patent is incorporated herein by reference.

The ability to discriminate between cartridge types, such as those containing a retroreflective marker and those containing a latent illuminance marker, after insertion into a data storage device but prior to putting the read/write heads on the recording media is of significant value and utility. Principally this utility comes from the ability to detect the difference between various capacities or generations of data storage cartridges in a downward media compatible data storage drive. This discrimination capability allows for drive/media specific adjustments to be made such as media rotation rate, data channel rates, location of Z track for initial seeking, or even mechanical adjustment in the drive like the active engagement of new crash stop locations. The ability of a disk drive to predetermine the type/generation of data storage cartridge inserted into it prior to enabling the spin-up and engagement of read/write elements also provides the drive system designer with new possibilities for cross-platform interchangeability.

A "caddy" cartridge provides cross drive platform compatibility, for example between mini-cartridges and personal computer cartridges. The ability to recognize the installation of a "caddy" into the drive prior to spinning up of the "caddy" and loading of heads is necessary. Rotational speed adjustments, Z track location information, data channel rate, and crash stop/ID and OD data track location information must be determined prior to read/write head loading. This invention provides a solution of these problems also.

Although the art of data storage cartridges and disk drives is well developed, there remain some problems inherent in this technology, particularly distinguishing between different types or generations of cartridges. Therefore, a need exists for a system that produces reliable detection and discrimination between data storage cartridges.

SUMMARY OF THE INVENTION

The present invention is directed to a system for identifying a type of data storage cartridge having a marker, comprising: a light source for emitting light to illuminate the marker; a first photodetector for measuring a first intensity of light received from the marker; a second photodetector for measuring a second intensity of light received from the marker; and a microprocessor for determining the type of data storage cartridge responsive to the first intensity and the second intensity.

According to one aspect of the present invention, the system further comprises a comparator for comparing the first intensity and the second intensity to produce a comparison result and the microprocessor determines the type of data storage cartridge responsive to the comparison result.

In accordance with an aspect of the present invention, the light source is disposed approximately directly beneath an edge of the marker, the first photodetector is disposed approximately directly beneath the center of the marker, and the second photodetector is disposed adjacent to the light source.

In accordance with a further aspect of the present invention, when the first intensity is not less than the second intensity it is determined that the marker on the data storage cartridge is transmitting light in a nondirectional manner, and when the first intensity is less than the second intensity it is determined that the marker on the data storage cartridge is transmitting light in a directional manner.

In accordance with a further aspect of the present invention, the light source is a light emitting diode (LED) and each photodetector is a phototransistor or a photodiode.

In a further embodiment within the scope of the present invention, a data storage drive is provided that comprises: a light source; a first photodetector; a second photodetector; and a microprocessor. The data storage drive is adapted to receive a cartridge comprising: a body; a data storage medium on the body; and a marker on the body. The marker is a material which receives irradiance from the light source and transmits irradiance one of nondirectionally and directionally toward the first and second photodetectors for detection. The microprocessor determines a type of cartridge responsive to an output of the first photodetector and an output of the second photodetector.

Another embodiment within the scope of this invention includes the combination of a data storage drive and a cartridge for the drive. The drive comprises: a light source; a first photodetector; a second photodetector; and a microprocessor. The cartridge comprises: a body; a data storage medium on the body; and a marker on the body. The marker is a material which receives irradiance from the light source and transmits irradiance nondirectionally or directionally toward the first and second photodetectors for detection. The microprocessor determines a type of cartridge responsive to an output of the first photodetector and an output of the second photodetector.

According to another aspect of the present invention, the drive further comprises a comparator for comparing the output of the first photodetector and the output of the second photodetector to produce a comparison result. The microprocessor determines the type of cartridge responsive to the comparison result.

According to another aspect of the present invention, the light source is disposed approximately directly beneath an edge of the marker, the first photodetector is disposed approximately directly beneath the center of the marker, and the second photodetector is disposed adjacent to the light source.

According to another aspect of the present invention, when the output of the first photodetector is not less than the output of the second photodetector it is determined that the marker on the cartridge is transmitting irradiance nondirectionally, and when the output of the first photodetector is less than the output of the second photodetector it is determined that the marker is transmitting irradiance directionally.

According to another aspect of the present invention, when the output of the first photodetector is not less than the output of the second photodetector it is determined that the marker on the cartridge comprises a latent illuminance material and when the output of the first photodetector is less than the output of the second photodetector it is determined that the marker comprises a retroreflective material.

According to another aspect of the present invention, the marker is an indicator of whether the cartridge is correct and compatible for use in the drive.

Another embodiment within the scope of this invention includes a method of identifying a type of data storage cartridge having a marker, comprising the steps of irradiating the marker with a source of irradiance; detecting irradiance transmitted from the marker at a first photodetector and a second photodetector; and determining the type of data storage cartridge responsive to the detected irradiance.

According to another aspect of the present invention, the step of determining the type of data storage cartridge comprises the step of comparing the detected irradiance at the first photodetector with the detected irradiance at the second photodetector.

According to another aspect of the present invention, the method further comprises the steps of: disposing the source of irradiance approximately directly beneath an edge of the marker; disposing the first photodetector approximately directly beneath the center of the marker; and disposing the second photodetector adjacent to the source of irradiance.

The foregoing and other aspects of the present invention will become apparent from the following detailed description of the invention when considered in conjunction with the accompanying drawings.

DESCRIPTION OF EXEMPLARY
EMBODIMENTS AND BEST MODE

The present invention is directed to a system and method which is used to identify and discriminate the type of data storage cartridge (hereinafter also referred to as a disk cartridge or disk) that has been inserted into a disk drive. The present invention is used to distinguish between compatible or legitimate cartridges and incompatible objects as well as different types or generations of cartridges. The present invention compares signals (e.g., subtracts or divides signals) from various photodetectors to detect and determine the cartridge types. The present invention provides an optical detection mechanism so that it can be ascertained with near certainty that an inserted object is an appropriate disk cartridge of a certain type or generation. The present invention uses sensor comparison (e.g., subtraction or division) to distinguish between objects that return light directionally to its source and objects that return light diffusely.

Figure 1:
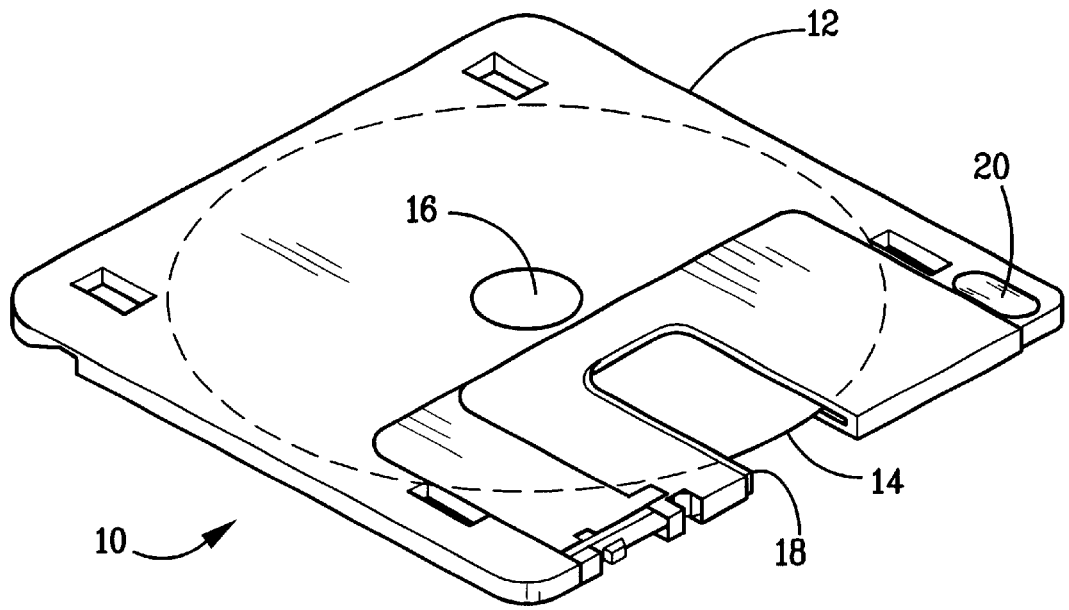
FIG. 1 shows an exemplary data storage cartridge of the present invention.
Figure 2:
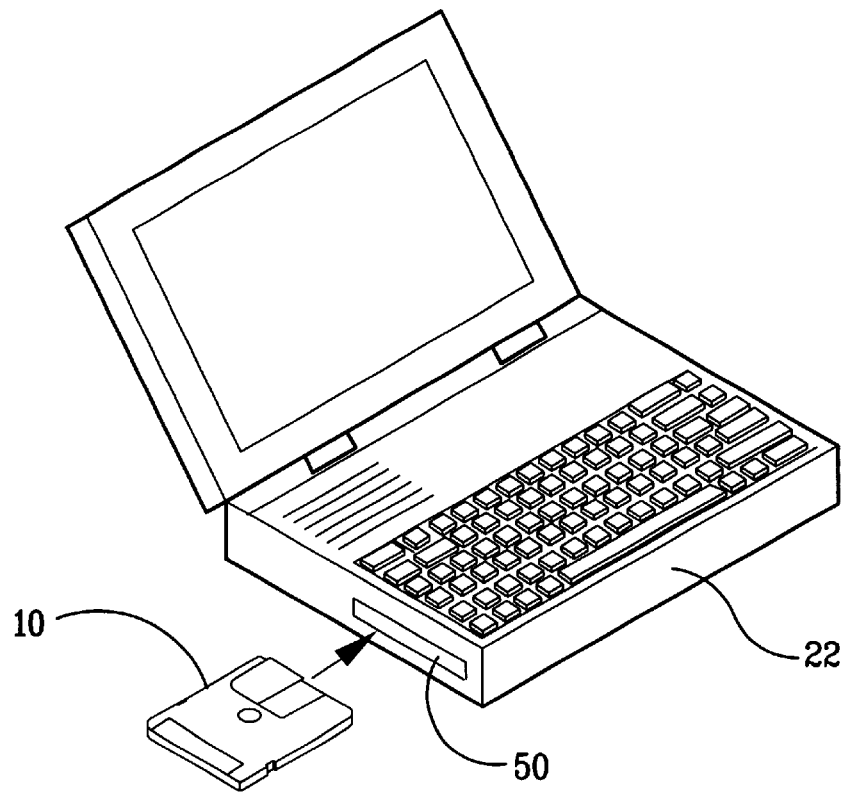
FIG. 2 is a perspective view of a device in which the invention is used.

FIGS. 1 and 2 show a cartridge and a disk drive to which the present invention is applicable. The cartridge and drive are described in the co-pending application entitled "INTERCHANGEABLE CARTRIDGE DATA STORAGE SYSTEM FOR DEVICES PERFORMING DIVERSE FUNCTIONS", Ser. No. 08/746,085, filed Nov. 6, 1996 which is incorporated herein by reference.

The disk cartridge 10 comprises an outer casing 12 and a disk-shaped recording medium 14 which is affixed to a hub 16 that is rotatably mounted in the casing 12. An opening on the bottom shell of the casing 12 provides access to the disk hub 16. A head access opening in the front peripheral edge 18 of the disk cartridge 10 provides access to the recording surfaces of the disk by the recording heads of a disk drive.

In accordance with the present invention, a tag or marker 20, such as a retroreflective marker described in "RETROREFLECTIVE MARKER FOR DATA STORAGE CARTRIDGE", U.S. Pat. No. 5,638,228, to Thomas, III, or a latent illuminance marker described in "LATENT ILLU- MINANCE DISCRIMINATION MARKER SYSTEM FOR DATA STORAGE CARTRIDGES", Ser. No. 08/936,970, filed Sep. 26, 1997, to Thomas, III, et al., is positioned on the disk cartridge 10 and is used to reflect or emit light that is to be detected by detectors in a disk drive. The detected light is used to identify the cartridge.

The marker can be attached to a data storage cartridge as a sticker, or printed onto or molded into a data storage cartridge. On each authorized disk cartridge, there is a marker which is preferably fabricated with a retroreflective material or a phosphorescent photoluminent material which serves to identify the type or generation of disk cartridge and distinguish it from other types of disk cartridges and purely passive light reflectors.

FIG. 2 shows a laptop computer 22 which has a disk drive 50 for receiving the disk cartridge 10 of FIG. 1. The drive 50 may be the Iomega ZIP drive which is disclosed and claimed in the U.S. patents identified in U.S. Pat. No. 5,638,228.

Figure 3:
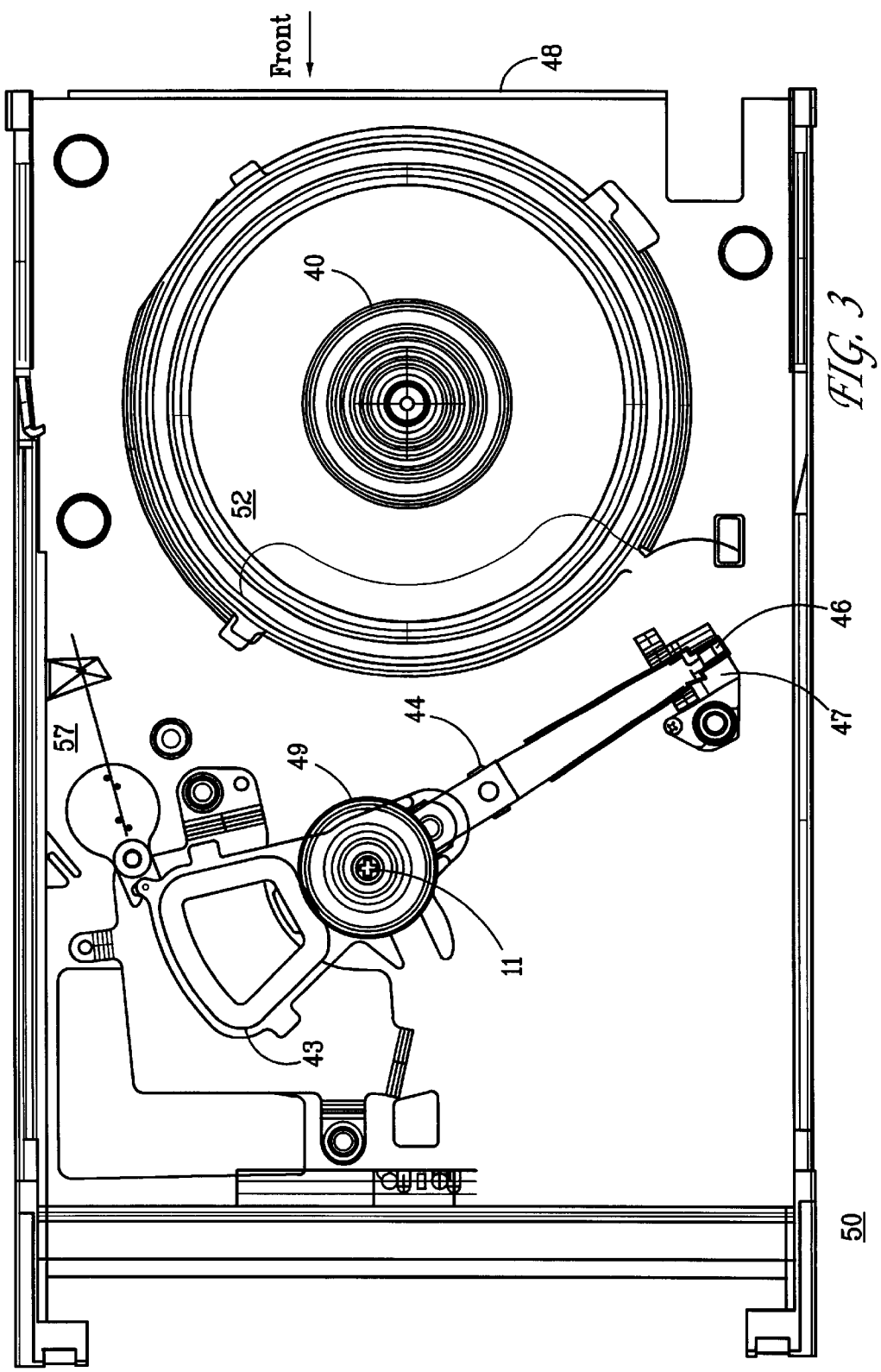
FIG. 3 is a top plan view of the disk drive of FIG. 2.

FIG. 3 is a top plan view of the internal components of an exemplary disk drive 50 with the upper case removed for clarity. The drive 50 comprises a chassis 57, an actuator 49, a spindle motor 52 and a spindle 40, and load ramps 47. The actuator comprises three major components: (1) a pair of load beams 44 with (2) a read/write head 46 disposed at the distal end of each load beam 44, and (3) a coil 43. Actuator 49 is driven by the voice coil 43 to pivot about point 11. When actuator 49 is not in use, it is generally retracted to the parked position (as shown).

A disk cartridge 10 can be inserted into an opening 48 in the front of drive 50 in the direction indicated by the arrow. During insertion, the disk 10 slides linearly along the top surface of chassis 57 and the spindle motor 52 for engagement with the read/write heads 46.

Figure 4:
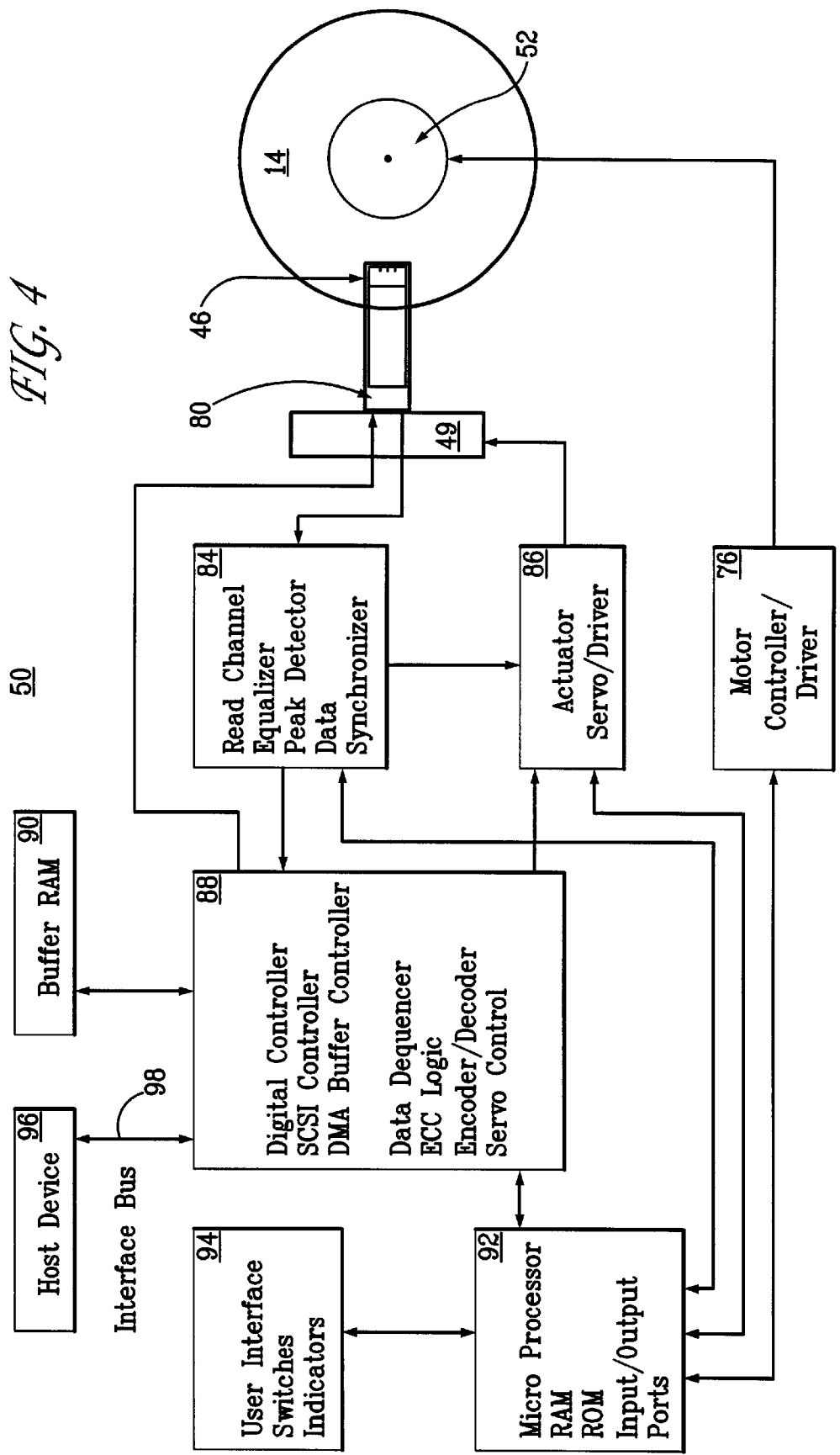
FIG. 4 a block diagram illustrating further details of the disk drive of FIG. 2 in accordance with the present invention.

FIG. 4 is a block diagram of the electronic components of an exemplary disk drive 50 in accordance with the present invention. As shown, the disk drive 50 comprises a spindle motor 52, motor controller/driver 76, read/write heads 46, read/write pre-amp 80, read channel 84, actuator 49, actuator servo/driver 86, digital controller 88, random access memory (RAM) buffer 90, microprocessor 92 and user interface components 94. The disk drive 50 connects to a user's host device 96 through an interface bus 98.

The motor controller/driver 76 and spindle motor 52 rotate the storage media 14 of the cartridge 10 at a constant speed, allowing the read/write heads 46 to "fly" close to the rotating storage media for a stable recording environment.

The read/write pre-amp 80 amplifies the signals picked up by the heads 46 during read operations and switches current in the heads 46 during write operations. The read channel 84 shapes the pulses from the pre-amp 80, qualifies the peaks that represent the user data and special information, and generates a clock that is synchronous with the data coming off the storage media 14.

The actuator servo/driver 86 demodulates servo information recorded on the storage media 14 and compensates to position the read/write heads 46 precisely on a selected track of the data storage media 14.

The digital controller 88 decodes and error checks the data from the read channel 84 and stores the data temporarily in a buffer memory. The controller 88 also ensures that data is written to, or read from, the correct track and sector of the storage media 14. The controller 88, when directed by the microprocessor 92, sends data from the buffer 90 to the host device 96, or from the host device 96 to the buffer 90, in accordance with a predefined protocol, such as ATAPI (AT Attachment Packet Interface).

The microprocessor 92 controls and monitors the functions in the drive 50. The program code is preferably stored in a read only memory (ROM), while RAM is preferred for storing variables, flags, status information, etc. The microprocessor 92 is responsible, in large part, for controlling the disk drive in accordance with the present invention. A significant function of the microprocessor 92 is to control a light source and determine the type of cartridge (or other object) that has been inserted into the drive responsive to light received at at least two photodetectors. Any suitable microprocessor can be employed, such as, for example, a Motorola 68HC16 microprocessor or an Intel 8032 microprocessor.

Figure 5:
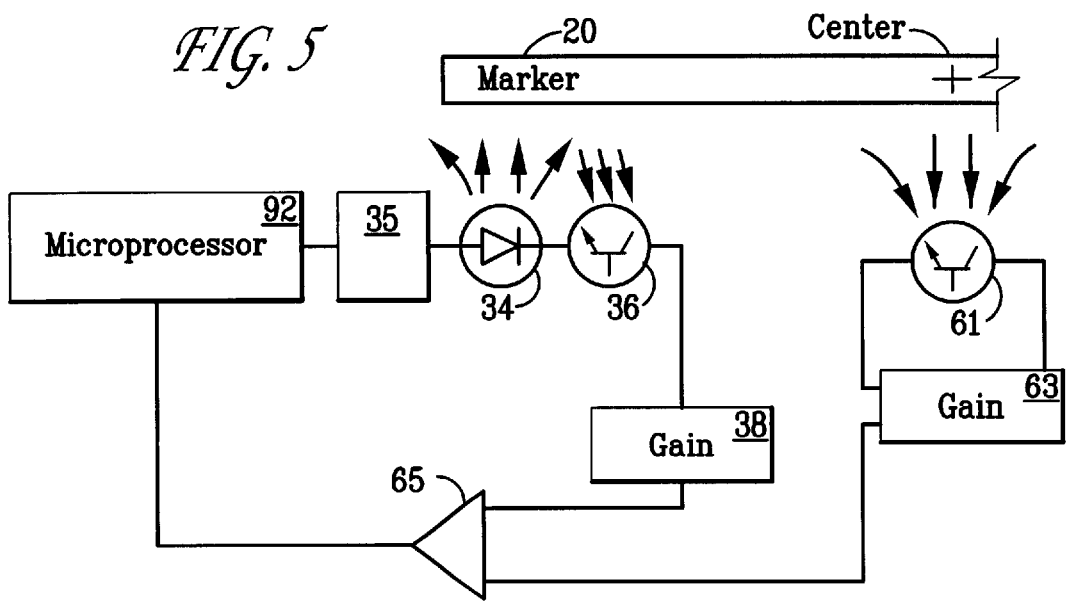
FIG. 5 shows a block diagram of an exemplary system in accordance with the present invention.

In a preferred embodiment, the disk drive has an emitter/detector pair and a second detector that are used for interrogation of the marker. FIG. 5 shows a block diagram of an exemplary system in accordance with the present invention. An emitter or light source 34, preferably an LED, illuminates a marker or tag 20. The LED 34 is driven by LED switching and current limiting electronics 35 and a microprocessor 92 which sends pulse commands to the electronics 35. The marker 20 transits illuminance by emission or reflection, for example, which is detected by a two photodetectors 36, 61. One photodetector (e.g., photodetector 36) is in close proximity to the LED 34. The photodetectors 36, 61 are each preferably a phototransistor or photodiode. Gain, preferably 100X, is applied to the output of the phototransistors or photodiodes 36, 61 by gain stages 38, 63, respectively. The outputs of the gain stages, 36, 61 are provided to a comparator 65 where they are compared to each other. The results of the comparison are provided to the microprocessor 92 which identifies the disk cartridge responsive to the comparison, as described below. Thus, the disk drive microprocessor 92 or a functionally similar system monitors the output of the photodetectors 36, 61 and, determines the intensity at the photodetectors 36, 61. The intensities measured by the drive photodetectors 36, 61 provide information by which the drive can determine which generation or type of cartridge has been inserted.

Figure 6:
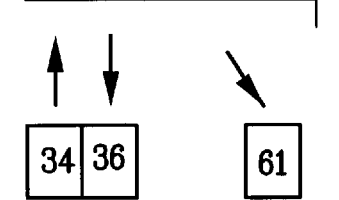
FIG. 6 shows an exemplary arrangement of the phototransistors and light source in accordance with the present invention.

In a preferred embodiment, as shown in FIG. 6, one photodetector 61 is placed directly below the center of the reflective object 20, and another photodetector 36 is placed off the center axis of the area of the reflective object 20. A light source 34 is placed near the photodetector 36 that is off the center axis of the reflective object 20. The light source (e.g., LED) 34 is illuminated, and the signal intensity levels at the photodetectors 36, 61 are compared to each other (or a difference or a ratio is determined). Depending on the results of the comparison, the type or generation of a cartridge having the reflective object 20 is determined.

The marker will transmit light in a manner that varies with the type of marker that is present. For example, a latent illuminance or phosphor marker reflects light nondirectionally, and a retroreflective marker reflects directionally back to the source. For light reflected from a retroreflective marker, a detector directly below the marker will have a relatively small signal level or intensity, while a detector offset from the marker and in close proximity to the LED will have a relatively large signal level or intensity. On the other hand, for light emitted or reflected from a marker or other object diffusely, a detector directly below the marker will have a signal level or intensity that is substantially the same as or larger than that of a detector that is offset from the marker and in close proximity to the LED. Thus, by comparing the signal levels or intensities of the detected light at the detectors, it can be determined if the light was transmitted in a directional or retroreflective or diffuse manner. Accordingly, it can then be determined if the marker is a retroreflective marker, or is a latent illuminance (phosphor) marker, thereby identifying the type or generation of the inserted disk cartridge.

More particularly, with the light transmitted in a directional/retroreflective manner, the light at the detector 36 (which is offset from the marker) will have a signal level or intensity much greater than the light at the detector 61 (which is approximately directly below the marker). Thus, if the light intensity at the detector 36 is greater than the light intensity at the detector 61 (i.e., $light_{offset} > light_{below}$), then the marker is transmitting light in a directional/retroreflective manner and is thus determined to be a retroreflective marker, or other marker that transmits light in a directional manner. The cartridge type to which the marker is attached can thus be identified.

With the light transmitted in a diffuse manner, the light at the detector 36 will have a signal level or intensity that is approximately equal to or less than that of the light at the detector 61. Thus, if the light intensity at the detector 36 is approximately equal to or less than the light intensity at the detector 61 (i.e., $light_{below} = light_{offset}$ or $light_{below} > light_{offset}$) then the marker is transmitting light in a diffuse (nondirectional) manner and is thus determined to be a latent illuminance (phosphor) marker, or other marker that transmits/reflects light in a diffuse manner. The cartridge type to which the marker is attached can thus be identified.

It should be noted that the comparison can be performed by the microprocessor or by a separate component. Moreover, the comparison can be (1) a direct comparison of the signal levels to each other, (2) a subtraction of one signal from another and comparing the difference to a predetermined number, or (3) a division of one signal by another and comparing the ratio to a predetermined number. Thus, the signals from the two phototransistors are electrically combined so that the amplitude of the signal from one phototransistor is compared from the amplitude of the signal in the other phototransistor. Hence, the sensor system of the present invention can detect and identify compatible objects and reject incompatible objects.

Figure 7A:
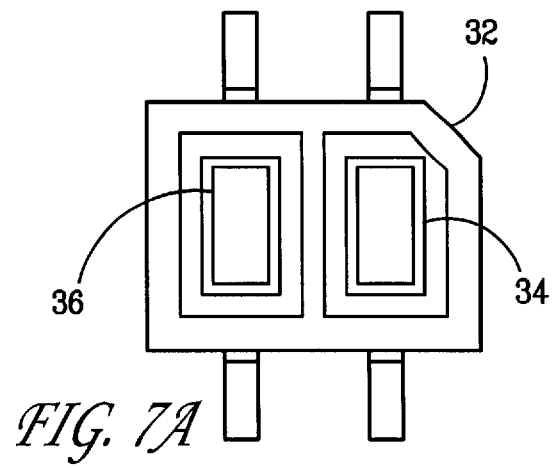
FIGS. 7A–7C respectively show top, side and edge views of an emitter/detector pair positioned in the drive to detect the marker.
Figure 7B:
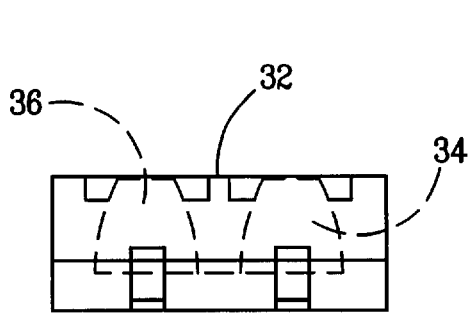
Figure 7C:
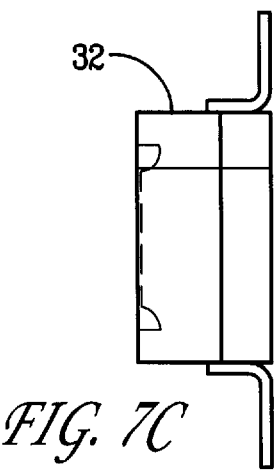

As described, the emitter is a light source, preferably an LED, and the detector is a photosensor or photodetector, preferably a phototransistor or photodiode. FIGS. 7A to 7C show the layout of a suitable emitter/detector pair 32 which includes LED 34 and phototransistor or photodiode 36. The marker 20 (shown in FIG. 5) is illuminated with the LED 34, and the output of the phototransistor or photodiode 36 is sampled as described above.

The addition of more than one emitter/detector pair allows for emission and detection of multiple lights which can be combined to detect and identify additional markers, cartridges, and objects. For example, combinations of diffuse light transmitting markers and directional light transmitting markers can be affixed to a cartridge at various positions with associated detectors positioned to sense the light. These combinations can be used to detect and identify additional generations or types of cartridges.

The present invention can be used to identify read only disks, write once disks, and disks having particular applications, such as photodisks for digital camera applications, global positioning or map disks, and book disks.

Although the present invention has been described herein with respect to cartridge detection, it can be used in any object detection or discrimination apparatus or application, such as anti-counterfeiting apparatus and applications.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A system for identifying a type of data storage cartridge having a marker, comprising:

a light source for emitting light to illuminate the marker, said light source disposed approximately directly beneath an edge of the marker;

a first photodetector for measuring a first intensity of light received from the marker, said first photodetector disposed approximately directly beneath the center of the marker;

a second photodetector for measuring a second intensity of light received from the marker, said second photodetector disposed adjacent said light source; and a microprocessor for determining the type of data storage cartridge responsive to said first intensity and said second intensity, wherein when said first intensity is not less than said second intensity it is determined that the marker on the data storage cartridge is transmitting light in a nondirectional manner, and when said first intensity is less than said second intensity it is determined that the marker on the data storage cartridge is transmitting light in a directional manner.

2. The system according to claim 1, further comprising a comparator for comparing said first intensity and said second intensity to produce a comparison result, wherein said microprocessor determines the type of data storage cartridge responsive to said comparison result.

3. The system according to claim 1, wherein said light source is a light emitting diode (LED) and each said first and second photodetector is one of a phototransistor and a photodiode.

4. A data storage drive comprising:

a light source;

a first photodetector;

a second photodetector; and a microprocessor, said data storage drive adapted to receive a cartridge comprising:

a body;

a data storage medium on said body; and a marker on said body, said marker being a material which receives irradiance from said light source and transmits irradiance one of nondirectionally and directionally toward said first and second photodetectors for detection, said microprocessor determining a type of cartridge responsive to an output of said first photodetector and an output of said second photodetector.

5. The data storage drive according to claim 4, wherein said light source is a light emitting diode (LED) and each said first and second photodetector is one of a phototransistor and a photodiode.

6. The data storage drive according to claim 4, further comprising a comparator for comparing said output of said first photodetector and said output of said second photodetector to produce a comparison result, wherein said microprocessor determines the type of cartridge responsive to said comparison result.

7. The data storage drive according to claim 4, wherein said light source is disposed approximately directly beneath an edge of said marker, said first photodetector is disposed approximately directly beneath the center of said marker, and said second photodetector is disposed adjacent to said light source.

8. The data storage drive according to claim 7, wherein when said output of said first photodetector is not less than said output of said second photodetector it is determined that said marker on the cartridge is transmitting irradiance nondirectionally, and when said output of said first photodetector is less than said output of said second photodetector it is determined that said marker is transmitting irradiance directionally.

9. The combination of a data storage drive and a cartridge for said drive, said drive comprising:
   a light source;
   a first photodetector;
   a second photodetector; and
   a microprocessor, said cartridge comprising:
      a body;
      a data storage medium on said body; and
      a marker on said body, said marker being a material which receives irradiance from said light source and transmits irradiance one of nondirectionally and directionally toward said first and second photodetectors for detection, said microprocessor determining a type of cartridge responsive to an output of said first photodetector and an output of said second photodetector.

10. The combination according to claim 9, wherein said light source is a light emitting diode (LED) and each said first and second photodetector is one of a phototransistor and a photodiode.

11. The combination according to claim 9, wherein said drive further comprises a comparator for comparing said output of said first photodetector and said output of said second photodetector to produce a comparison result, and wherein said microprocessor determines the type of cartridge responsive to said comparison result.

12. The combination according to claim 9, wherein said light source is disposed approximately directly beneath an edge of said marker, said first photodetector is disposed approximately directly beneath the center of said marker, and said second photodetector is disposed adjacent to said light source.

13. The combination according to claim 12, wherein when said output of said first photodetector is not less than said output of said second photodetector it is determined that said marker on the cartridge is transmitting irradiance nondirectionally, and when said output of said first photodetector is less than said output of said second photodetector it is determined that said marker is transmitting irradiance directionally.

14. The combination according to claim 13, wherein when said output of said first photodetector is not less than said output of said second photodetector it is determined that said marker on the cartridge comprises a latent illuminance material and when said output of said first photodetector is less than said output of said second photodetector it is determined that said marker comprises a retroreflective material.

15. The combination according to claim 9, wherein said marker is an indicator of whether said cartridge is correct and compatible for use in said drive.

16. A method of identifying a type of data storage cartridge having a marker, comprising the steps of:
   disposing a source of irradiance approximately directly beneath an edge of the marker;
   disposing a first photodetector approximately directly beneath the center of the marker;
   disposing a second photodetector adjacent to said source of irradiance;
   irradiating the marker with said source of irradiance;
   detecting irradiance transmitted from the marker at said first photodetector and said second photodetector; and
   determining the type of data storage cartridge responsive to said detected irradiance, comprising comparing said detected irradiance at said first photodetector with said detected irradiance at said second photodetector,
   wherein when said detected irradiance of said first photodetector has an intensity that is not less than an intensity of said detected irradiance of said second photodetector it is determined that said marker on the cartridge is transmitting irradiance nondirectionally, and when said intensity of said detected irradiance of said first photodetector is less than said intensity of said detected irradiance of said second photodetector it is determined that said marker on the cartridge is transmitting irradiance directionally.

17. The method according to claim 16, wherein when said intensity of said detected irradiance of said first photodetector is not less than said intensity of said detected irradiance of said second photodetector it is determined that said marker on the cartridge comprises a latent illuminance material, and when said intensity of said detected irradiance of said first photodetector is less than said intensity of said detected irradiance of said second photodetector it is determined that said marker on the cartridge comprises a retroreflective material.

* * * * *